July 24, 1934.　　O. P. DIETZEL ET AL　　1,967,553
APPARATUS FOR CARBONATING BEVERAGES
Filed May 2, 1933　　2 Sheets-Sheet 1

Inventors:
Otto Paul Dietzel &
Eugen Ruben.
by Charles Ackerman atty

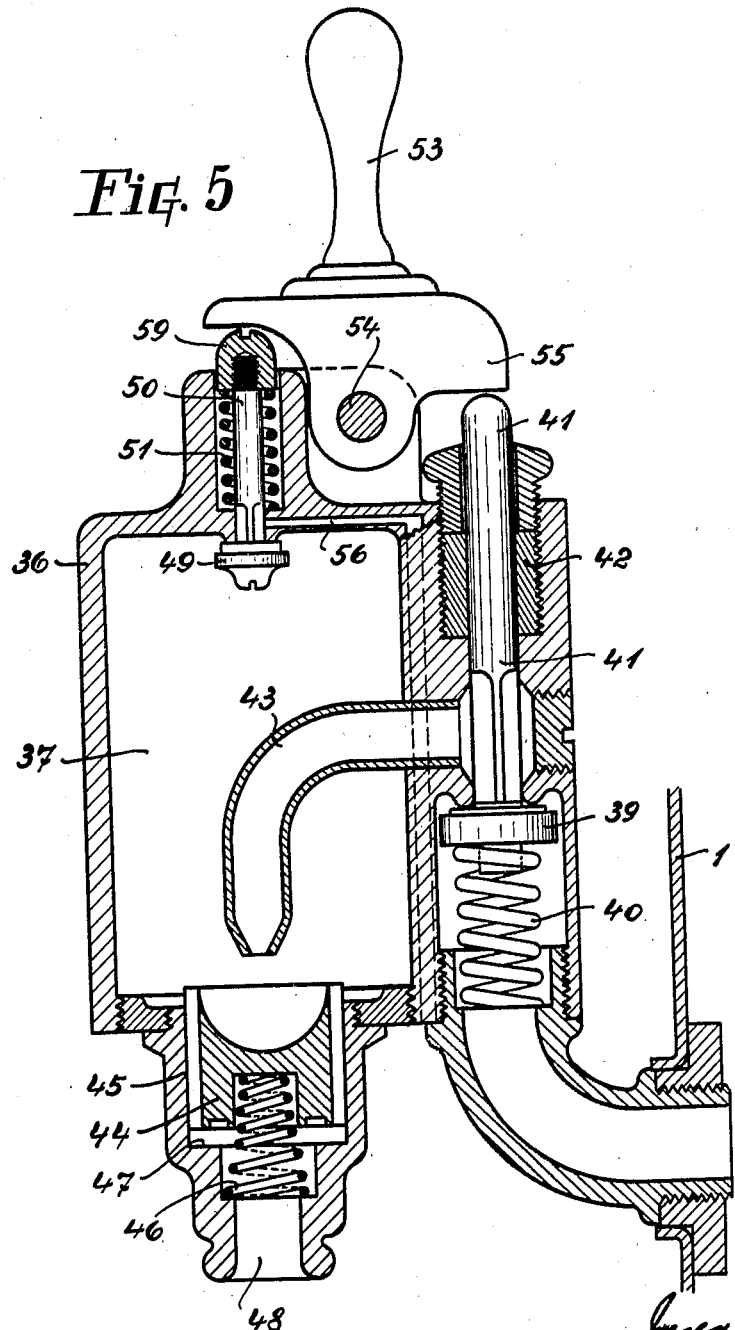

Patented July 24, 1934

1,967,553

UNITED STATES PATENT OFFICE 1,967,553

APPARATUS FOR CARBONATING BEVERAGES

Otto Paul Dietzel, Cologne-on-the-Rhine, and Eugen Ruben, Dusseldorf, Germany

Application May 2, 1933, Serial No. 669,050
In Germany May 3, 1932

8 Claims. (Cl. 225—21).

The present invention relates to apparatus for making beverages and drinks impregnated with carbon dioxide and employing dry ice, the latter being brought into contact with the liquid to be impregnated, inside a closely sealed chamber, so that the dry ice (solidified carbon dioxide) is converted into the gaseous state and at the same time the water is cooled, the pressure developed and the gas dissolved in the liquid.

The object of the invention is an apparatus of this kind in whose interior there is provided, underneath the closable opening for introducing the dry ice, a receiving vessel which is accessible through said opening and which is provided with auxiliary means whereby its contents may be brought into contact with the liquid filling of the chamber after the closing of the generating chamber. Thus, useless and troublesome generation of gas before the closing of the ice-introduction opening, is avoided.

A further feature of the invention is that the generating chamber is rigidly combined with a second chamber which can be hermetically sealed and which is separably connected to the interior of the former in such a way that the beverage, saturated in the generating chamber, can be transferred to this ante-chamber or storage chamber, whence it can be drawn off by the glass, without any long interruption, whilst the generating chamber is thus rendered free for the reception and treatment of fresh quantities of the drink. The invention also relates to a double, separable connecting passage between the two chambers of the apparatus, whereby, before the transfer of the liquid from the generating chamber into the storage chamber, the gas pressure between the two chambers may be equalized and the transfer of liquid effected without shock and without any expulsion of the dissolved carbon dioxide. Further the invention provides auxiliary means which enable the pressure of the liquid to be relieved when it is served by the glass.

Figure 1:
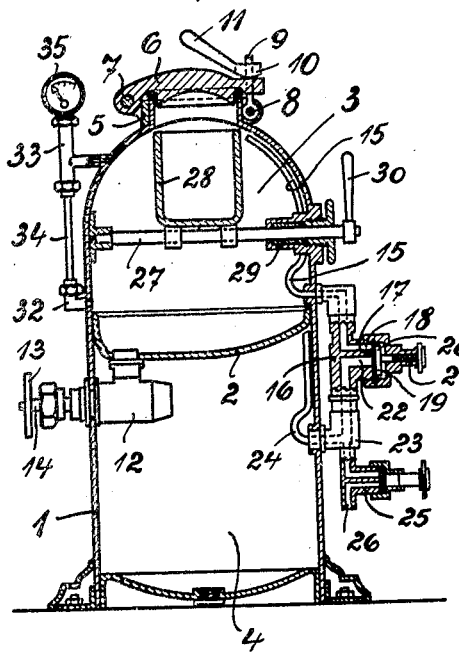
Figure 2:
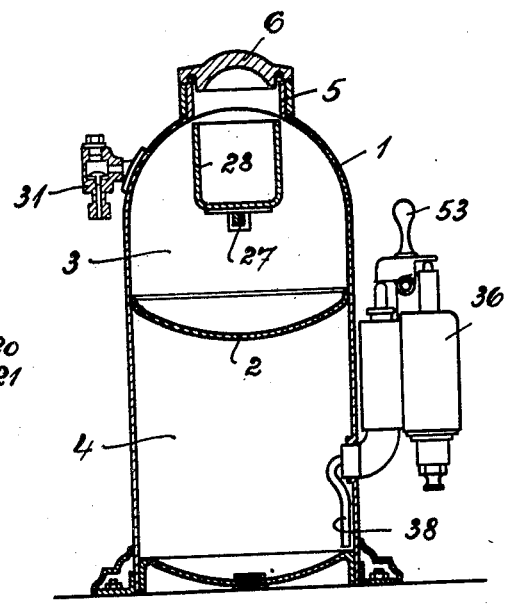
Figure 3:
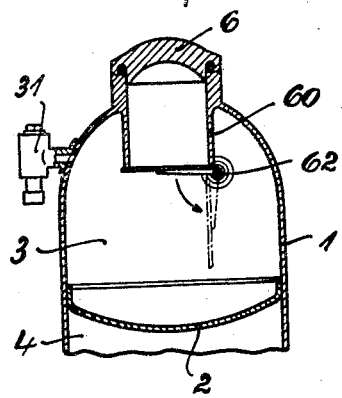
Figure 4:
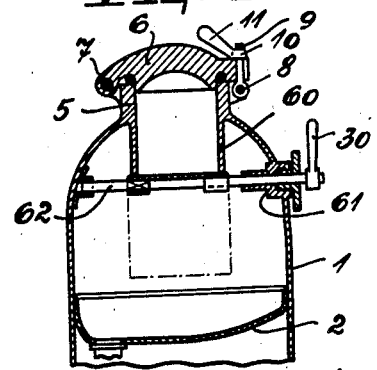

The invention will be better understood by reference to the accompanying drawings in which a suitable apparatus is shown;

Fig. 1 being a vertical section through its central plane,

Fig. 2 a similar section through a plane at 90° from the plane as in Fig. 1,

Fig. 3 a section, corresponding to Fig. 1, but of the upper portion of another embodiment of the apparatus, and Fig. 4 a transposed section, as in Fig. 2, through the apparatus shown in Fig. 3, Fig. 5 gives a vertical section to a larger scale, through the drawing-off device for the apparatus.

Essentially the apparatus consists of a pressure container 1, which by means of a horizontal partition 2, is divided into an upper generating chamber 3 and a lower storage space 4. The generating chamber is provided at the top with a charging opening whose edge is strengthened by a reinforcing ring, to which the cover 6, for sealing up the opening is secured, laterally swinging by means of a hinge pin 7. The cover is locked by means of a screwed bolt 9, opposite the hinge pin 7 and swivelling about the pin 8, its tightening nut 10 being provided with a handle 11.

The inside of the generating chamber 3, is connected to the storage space 4, by means of a T-shaped union 12, which contains a shut-off valve whose passage is normally closed. The valve can be opened and closed by means of the valve spindle 14 which passes through the storage chamber and is provided on the outside with a handwheel 13. Moreover the interior of the generating chamber 3 is connected to the storage space by a passage which commences with the tube 15 which merges into the interior of the generating chamber near its upper opening. The tube passes downwards through the wall of the pressure vessel and is connected to the body 16 of a transfer valve attached to the outside of said vessel. This valve may take the form, for example, of a diaphragm reducing valve and when a certain pressure is exceeded in the generating chamber, the excess of gas evolved therein is allowed to escape through an outlet opening provided in the valve seat face 17, into the space 19 between this surface and the diaphragm 20 which is adjustably loaded by a spring 21.

By means of a second low pressure passage 22, merging into the valve seat face, the space 19 under the diaphragm 20 is connected through a side branch 23 to a connecting tube 24 arranged at the interior of the storage space and entering into its upper portion. The pressure is limited in the storage chamber and, via the transfer valve, also in the generating chamber by arranging a blow-off safety valve 25 on the low pressure passage 22. This valve may take the form of a diaphragm reducing valve, for example like the transfer valve and, when the pressure in the storage space has reached a certain maximum limit, it allows the excess of gas to escape outwards through its branch 26.

At a certain distance below the top opening, the generating chamber 3 is traversed by a horizontal spindle 27, to which a bucket-shaped receptacle 28 is attached. When the latter is in the erect position, its open top finds itself underneath the upper charging opening of the generating chamber. One end of the transverse spindle 27 is led outwards through a stuffing box 29 and is provided there with a hand lever 30, so that by means of the latter, the receptacle 28 can be tipped over. Hence the dry ice introduced into this receptacle through the charging opening of the generating chamber may, after closing the cover, be tipped into the bottom portion of the generating chamber. A filling branch 31 is also arranged at the outer wall of the generating chamber and serves to pass the gas-saturated water into the generating chamber via a check valve arranged in it. Two mountings 32, 33 are also fitted to the outside of the chamber and a water level gauge 34 is arranged between them whilst the upper one is preferably surmounted by a pressure gauge 35.

To use the apparatus, the generating chamber is partially filled with water, say up to the level of the transverse spindle and, after opening the lid or cover 6, the necessary quantity of dry ice is charged into the receptacle 28. When the cover 6 is closed and screwed up, the spindle 27 is so rotated by means of the hand lever 30, that the contents of the receptacle are tipped into the water filling the bottom space of the generating chamber. This causes the transformation of the solidified carbon dioxide into the gaseous state accompanied by a vigorous development of cold and pressure. Hence the water is thoroughly saturated with dissolved carbon dioxide gas fairly quickly. As soon as the pressure limit of say 10 atm. set on the spring of the valve, is exceeded, the gas delivered by the tube 15 passes over into the storage space out of the top space in the generating chamber.

The pressure of the gas pressing into this space may rise up to the limit say up to 5 atm., which is set by the loading spring of the blow-off valve 25. When this valve ceases to blow-off, it is an indication of the completion of the generation process, i. e., the conversion of the last remains of ice into gaseous carbon dioxide in the generation chamber 3. Now, by means of the hand-wheel 13, the shut-off valve fitted in the union piece 12, is opened, so that the water saturated with carbon dioxide can pass into the storage space. Before the commencement of this action however, a considerable gas pressure has already been established in the lower vessel, thereby preventing the releasing of the dissolved gas from the saturated water.

In order to make this effect still more complete, it is also possible, by temporarily releasing the loading of the spring of the transfer valve 16, to bring about a complete equalization of the pressure in the upper and lower chamber of the pressure vessel before the opening of the intermediate valve. As a rule, however, it is possible to dispense with this alteration in the loading of the transfer valve which is rather undesirable in practice. After the saturated water has been transferred from the generating chamber into the storage chamber, this intermediate valve is closed and after preliminarily discharging the pressure existing in the generating chamber, the latter can again be charged with water and dry ice and used again for producing gas-saturated water without affecting the serving of the gas-saturated water from the storage container.

The receptacle which serves temporarily to hold the dry ice before closing the charging opening in the generating chamber, need not be movably arranged under this opening. As shown in Figs. 3 and 4, the sides 60 of this receptacle may also be arranged adjacent the neck of the generating chamber and rigidly secured thereto, only the bottom of the receptacle being hinged. By means of a spindle 62 led outwards through the stuffing box 61 and by means of a hand lever arranged on this spindle, this hinged bottom may be kept closed or lowered for the purpose of emptying the receptacle.

In order to prevent the expulsion of the dissolved gas from the water when the pressure saturated water is served directly, the storage vessel is preferably connected to a serving device 36, which contains a pressure releasing chamber 37 whose inner space is large enough to receive the liquid necessary for filling the particular drinking glass or other vessel. By means of a delivery tube 38 proceeding from the bottom of the storage space and by means of a filling valve 39, the pressure relieving chamber is connected to the vessel. The valve opens against this direction of flow and is forced by a spring 40 on to its seat. An axial spindle 41 is attached to the outside of this valve and is led outwards through a stuffing box 42.

A tubular bend 43 adjoins the passage-way of the valve above the seating and terminates above a tapping valve 44 which is arranged in the bottom of the pressure relieving chamber. This tapping valve is vertically guided in a cylindrical by-chamber 45 in the pressure relieving chamber and fills it like a piston with a small amount of clearance. In the pressure-free condition the valve cone is borne by a pressure spring 46 so that it is held at a small distance floating above its seating face 47, to which the tapping passage 48 is connected in the middle.

At the upper end face of the pressure relieving chamber a relief valve 49 is so arranged that its spindle 50 passes outwards through the wall of this chamber. A helical spring 51 surrounding this spindle forces the valve from the inside against its seating, the spring resting against a screw head 59 forming the end of the spindle. A hand lever 53 pivoting about a pin 54 is arranged at the outside of the casing between the point of exit of the spindle 50 of the discharge valve 49 and the spindle 41 of the filling valve 39. The hand lever is widened underneath into a kind of cross-head with which it can engage with the ends of the two valve spindles 41 and 50. By successively moving this lever backwards and forwards, it is therefore possible first of all to open the filling valve 39, so that gas-saturated water can pass from the storage space into the pressure relieving chamber and, partly through the direct impact of the outflowing water and partly due to the immediately evolved pressure, the tapping valve cone 44 is urged on to its seating, against the force of its pressure spring 46, thus shutting the pressure relieving chamber off from the outside.

With progressing filling of the pressure relieving chamber, the carbon dioxide gas contained therein is compressed in the top portion of the chamber, so that further filling can be completed quietly and without releasing dissolved gas. Then when the hand lever 53 is thrown over to the opposite side, the pressure relief valve is opened so that the gas floating above the liquid contents of the pressure relieving chamber can escape into the open air through a discharge passage 56 laterally adjoining the valve opening. When the pressure has been relieved, the tapping valve cone 44 is lifted under the action of the pressure spring 46, so that the liquid contents of the pressure relieving chamber can flow, free from pressure, through the tapping passage 48, into the vessel placed below.

We claim:

1. In an apparatus for producing beverages charged with carbon dioxide gas by gasifying solid carbon dioxide in a generating chamber having an admission opening and containing liquid to be charged, an upwardly open receptacle for the solid carbon dioxide arranged underneath the admission opening, said opening being provided with means for tightly sealing it, a storage chamber mechanically connected to said generating chamber by means of a transfer passage, proceeding from the bottom portion of said generating chamber, said passage containing a shut-off valve.

2. In an apparatus for producing aerated beverages, a generating chamber provided with a tightly sealed admission opening, an upwardly open receptacle for solid carbon dioxide beneath said opening, a storage chamber mechanically connected to said generating chamber by means of a transfer passage proceeding from the bottom portion of said generating chamber and containing a shut-off valve, a gas-pressure equalizing passage connecting the upper portions of both chambers and a valve in the pressure equalizing passage, said valve opening automatically against spring pressure, towards the storage chamber.

3. In an apparatus for producing aerated beverages, a generating chamber provided with a tightly sealing admission opening, an upwardly open receptacle for solid carbon dioxide beneath said opening, a storage chamber mechanically connected to said generating chamber by means of a transfer passage proceeding from the bottom portion of said generating chamber and containing a shut-off valve, a gas-pressure equalizing passage connecting the upper portions of both chambers, a valve in said pressure equalizing passage opening automatically against spring pressure, to the storage chamber and a pressure-relieving chamber connected by a shut-off valve to the storage chamber, said pressure-relieving chamber being provided with a pressure releasing valve and with a discharge valve opening by spring pressure after the equalization of the pressures.

4. In a carbonating apparatus for liquids, a liquid receptacle having a charging opening, a closure for said charging opening, an inner receptacle open to receive solid carbon dioxide from said opening, and means to discharge the contents of the inner receptacle into the lower part of the outer receptacle after the latter has been closed.

5. In a carbonating apparatus for liquids, a liquid receptacle having a charging opening, a closure for said charging opening, an inner receptacle open to receive solid carbon dioxide from said opening, means supporting the inner receptacle and rotatable on a horizontal axis whereby to permit inversion of the inner receptacle and discharge of its contents, and operating means exterior of the first receptacle for rotating said last mentioned means.

6. In a carbonating apparatus for liquids, a liquid receptacle having a charging opening, a closure for said charging opening, an inner receptacle open to receive solid carbon dioxide from said opening, a door forming the bottom of the inner receptacle, and door operating means exterior of the first receptacle and operatively connected to the door to open and close the same.

7. In a carbonating apparatus for liquids, a liquid receptacle having a charging opening, a closure for said charging opening, an inner receptacle open to receive solid carbon dioxide from said opening, means to discharge the contents of the inner receptacle into the lower part of the outer receptacle after the latter has been closed, a receiving chamber, a valved conduit connecting the bottom of the liquid receptacle with the receiving chamber, a second conduit connecting the tops of the liquid receptacle and the receiving chamber, and a normally closed pressure reducing valve in said second conduit.

8. In a carbonating apparatus for liquids, a liquid receptacle having a charging opening, a closure for said charging opening, an inner receptacle open to receive solid carbon dioxide from said opening, means to discharge the contents of the inner receptacle into the lower part of the outer receptacle after the latter has been closed, a receiving chamber, a valved conduit connecting the bottom of the liquid receptacle with the receiving chamber, a second conduit connecting the tops of the liquid receptacle and the receiving chamber, a normally closed pressure reducing valve in said second conduit, and a relief valve connected to the second conduit between the pressure reducing valve and the receiving chamber.

OTTO PAUL DIETZEL.
EUGEN RUBEN.